United States Patent
Cachin et al.

(10) Patent No.: US 9,515,845 B2
(45) Date of Patent: Dec. 6, 2016

(54) UTILITY COMMUNICATION METHOD AND SYSTEM

(71) Applicant: ABB Technology AG, Zürich (CH)

(72) Inventors: Dominique Cachin, Winterthur (CH); Mathias Kranich, Albbruck (DE); Christian Leeb, Zürich (CH)

(73) Assignee: ABB Schweiz AG, Baden (CH)

( * ) Notice: Subject to any disclaimer, the term of this patent is extended or adjusted under 35 U.S.C. 154(b) by 134 days.

(21) Appl. No.: 14/193,475

(22) Filed: Feb. 28, 2014

(65) Prior Publication Data

US 2014/0177477 A1 Jun. 26, 2014

Related U.S. Application Data

(63) Continuation of application No. PCT/EP2012/066858, filed on Aug. 30, 2012.

(30) Foreign Application Priority Data

Aug. 30, 2011 (EP) .................................. 11179342

(51) Int. Cl.
*H04L 12/46* (2006.01)
*H04L 12/735* (2013.01)
(Continued)

(52) U.S. Cl.
CPC ............. *H04L 12/4641* (2013.01); *H04L 1/22* (2013.01); *H04L 45/128* (2013.01); *H04L 45/22* (2013.01); *H04L 45/24* (2013.01); *H04L 47/125* (2013.01)

(58) Field of Classification Search
CPC ........ G06F 15/16; H04L 12/437; H04L 12/46; H04L 12/4641; H04L 12/56; H04L 12/707; H04L 45/00; H04L 45/24; H04L 12/462

See application file for complete search history.

(56) References Cited

U.S. PATENT DOCUMENTS

| 6,751,746 B1 | 6/2004 | Jain et al. |
| 7,373,543 B1 | 5/2008 | Jain et al. |

(Continued)

FOREIGN PATENT DOCUMENTS

| EP | 1 608 116 A1 | 12/2005 |
| EP | 1 798 906 A1 | 6/2007 |
| WO | WO 2011/038750 A1 | 4/2011 |

OTHER PUBLICATIONS

Cisco Systems, Inc 1992-2003.*

(Continued)

*Primary Examiner* — Andrew Lai
*Assistant Examiner* — Leon Andrews
(74) *Attorney, Agent, or Firm* — Taft Stettinius & Hollister LLP

(57) ABSTRACT

An exemplary method and system of the present disclosure use the Parallel Redundancy Protocol PRP (IEC 62439-3) for traffic duplication and redundant transport of the duplicated traffic in a single packet-switched wide-area communication network including a plurality of nodes interconnected via inter-node links in a meshed topology. The method involves identifying, between a send and receive node, two distinct communication paths with no link or node in common except for the send and receive node, and configuring the send and receive nodes to operate according to the Parallel Redundancy Protocol PRP. At any time during regular operation, and for any critical message to be transmitted from the send to the receive node, two redundant packets can be generated, and each of the redundant packets is sent via one of the two communication paths, resulting in an increased availability of the communication network without incurring the cost of full network duplication.

15 Claims, 1 Drawing Sheet

(51) Int. Cl.
*H04L 12/707* (2013.01)
*H04L 12/803* (2013.01)
*H04L 1/22* (2006.01)

(56) References Cited

U.S. PATENT DOCUMENTS

| | | | |
|---|---|---|---|
| 2006/0013210 A1 | 1/2006 | Bordogna et al. | |
| 2010/0195498 A1* | 8/2010 | Hemli | H04L 45/00 370/235 |
| 2011/0029687 A1* | 2/2011 | Kirrmann | H04L 12/437 709/236 |
| 2014/0146701 A1* | 5/2014 | Bragg | H04L 12/462 370/252 |

OTHER PUBLICATIONS

Cisco—Undrstanding Multiple Spanning Tree Protocol by Cisco Systems, Inc, 1992-2003.*

International Search Report (PCT/ISA/210) mailed on Dec. 4, 2012, by the European Patent Office as the International Searching Authority for International Application No. PCT/EP2012/066858.

International Preliminary Report on Patentability (PCT/IPEA/409) mailed on Dec. 13, 2013, by the European Patent Office as the International Preliminary Examining Authority for International Application No. PCT/EP2012/066858.

Search Report mailed on Oct. 14, 2011, by the European Patent Office for Application No. 11179342.8.

"Part 3: Parallel Redundancy (PRP) and High-availability Seamless Redundancy (HSR)", International Electrotechnical Commission, Dec. 2010, pp. 1-62, Retrieved from the Internet: http://lamspeople. epfl.ch/kirrmann/Pubs/IEC_61439-3/WG15-12-04d_62439-3_ AMD_HK_101109.pdf, XP002680227.

Meier, "Doppelt gemoppelt hält besser PRP-Parallel Redundancy Protocol, Redundanzkonzept ohne Umschaltung, (Committee Draft IEC 62439, Kap. 6)", InES, Jan. 2007, pp. 1-36, Retrieved from the Internet: http://www.electrosuisse.ch/display.cfm?id=113760, XP002462282.

Cisco Systems et al., "Understanding Multiple Spanning Tree Protocol (802.1s)", May 2005, pp. 1-14, Retrieved from the Internet: http://web.archive.org/web/20050514065955/www.cisco.com/ warp/public/473/147.pdf, XP002426379.

* cited by examiner

UTILITY COMMUNICATION METHOD AND SYSTEM

RELATED APPLICATION(S)

This application claims priority under 35 U.S.C. §120 to International application PCT/EP2012/066858 filed on Aug. 30, 2012, designating the U.S., and claiming priority to European application 11179342.8 filed in Europe on Aug. 30, 2011. The entire content of each prior application is hereby incorporated by reference.

FIELD

The disclosure relates to the field of utility communication, for example to wide-area communication over communication networks with meshed topology and high availability.

BACKGROUND INFORMATION

Utilities provide for water, gas or electrical energy on a continuous basis and via suitable transmission and distribution systems. The latter include sites, such as sources and substations, which have to be coordinated in one way or the other across distances of hundreds of kilometers. Within utility communication systems that are associated with the distribution systems, a variety of messages are exchanged over long-distance communication links between distant sites of the utility in order to safely transmit and distribute water, gas or electrical energy.

For securely transmitting messages over long distances from one site to the other, the utility may revert to a Wide-Area communication Network (WAN). In the present context, a WAN can be a dedicated point-to-point communication link between two sites based on for example optical fiber or pilot wires, a connection-oriented communication network with a guaranteed data rate such as Ethernet over SDH/HDLC, or a packet-oriented communication network interconnecting a number of sites of the utility, and including a plurality of specific network elements such as switches, repeaters and possibly optical transmission media at the physical layer.

Electric power utilities can rely on connection-oriented or circuit-switched SDH (Synchronous Digital Hierarchy) or SONET (Synchronous Optical Networking) networks for communication of mission critical operation data like teleprotection signaling or SCADA (Supervisory Control and Data Acquisition) control and supervision data. This technology features proven quality of service and path resilience of less than 50 ms, for example, in case of a failure of an optical link. Further, it can be possible to predefine the data path that a particular communication service shall follow inside the network, which is referred to as 'traffic-engineering' in the following.

FIG. 1 depicts a communication network with a meshed topology according to a known implementation. Namely, FIG. 1 shows an exemplary communication network with a meshed topology or structure as often found in utility networks, in which nodes 1 to 5 and links a to g form a plurality of loops. Each node is connected to at least two neighboring nodes of the meshed network as well as to client or end devices (not shown) running utility applications that communicate over the network. While in this topology the normal traffic path for data between node 1 and 3 is through the link a-b, SDH and SONET systems are capable of switching this traffic to for example links c-g-f within 50 ms, for example, in case of a fiber link failure in link a. An important prerequisite in order to enable this path switchover is the traffic engineering, which allows the user to predefine the working path of the communication service, e.g., link a-b, and equally to predefine the protecting path for these services, e.g., links c-g-f, and to configure the nodes to handle traffic accordingly.

In another known implementation, and as an alternative to the above-mentioned connection-oriented communication network, the Wide Area communication Network (WAN) may be a packet-switched communication network, such as an Ethernet (Layer-2 of the OSI communication stack) network or an IP (Layer-3) network with a number of interconnected switches or routers as the nodes. In the context of the present disclosure, the difference between a Local Area Network (LAN) and a WAN is considered to reside in the geographical extension rather than in the network topology, with WAN inter-node distance in excess of 10 km, for example, as opposed to LANs restricted to individual premises or utility substations.

In known communication systems technology implementations, within any Local Area Network (LAN) constructed by connecting a plurality of computers or other intelligent devices together, a concept called "virtual LAN" (VLAN) employs functionality for grouping terminals or nodes which are connected to switches of the network. Ethernet VLANs according to IEEE 802.1Q allow restricting access to the terminals connected to an Ethernet network within a VLAN as well as restricting the data flow of multicast Ethernet messages to predefined parts of the Ethernet network to which receiver terminals belonging to the same VLAN are connected.

In known Ethernet switch-based networks VLAN definitions can be handled within the Ethernet switches, therefore the latter have to be configured or otherwise made aware of the relevant VLANs. Furthermore, it is assumed that any single connected terminal belongs to one specific VLAN. This terminal can then communicate with other terminals belonging to the same VLAN. When configuring the switches, the port to such single-connection terminal is therefore called access port, and this access port should be allowed to belong to one VLAN, while the other ports internal to the communication system, called trunk ports, may belong to several VLANs.

A recently introduced standard entitled Parallel Redundancy Protocol (PRP, IEC 62439-3 Clause 4) provides for seamless redundancy and switchover for Ethernet based communication systems with two redundant, e.g., fully duplicated, Ethernet networks. Ethernet traffic entering a PRP capable node is duplicated by this node and sent to a destination node via the two redundant networks. The destination node undoes the redundancy by accepting the first of the duplicated packets and by discarding the redundant packet that in normal operation arrives at a later time. By duplicating the traffic and sending it over two distinct networks, the failure of any network link in the system does not interrupt or delay the traffic between the sender and receiver node.

While PRP is a viable solution for LANs, the erection of fully redundant wide-area utility communication networks with suitably duplicated network elements is neither a practical nor an economical solution. For example, where the utility already owns and operates a communication network with non-redundant links, subsequent duplication of for example optical fiber links is not appealing.

SUMMARY

An exemplary method of configuring a packet-switched wide-area communication network including a plurality of nodes interconnected via inter-node links in a meshed topology is disclosed, comprising: identifying, between a send node and a receive node, first and second communication paths; and configuring the send and receive node to operate according to the Parallel Redundancy Protocol PRP, with first and second communication ports of the send node and first and second communication ports of the receive node being assigned to the first and second communication path, respectively.

An exemplary configuration tool for configuring a packet-switched wide-area communication network is disclosed, comprising: a processor configured to: identify, between a send node and a receive node, first and second communication paths; and configure the send and receive node to operate according to the Parallel Redundancy Protocol PRP, with first and second communication ports of the send node and first and second communication ports of the receive node being assigned to the first and second communication path, respectively.

BRIEF DESCRIPTION OF THE DRAWINGS

The subject matter of the disclosure will be explained in more detail in the following text with reference to preferred exemplary embodiments which are illustrated in the attached drawings, in which.

DETAILED DESCRIPTION

Exemplary embodiments of the present disclosure provide for seamless redundancy in wide-area communication networks without a full duplication of network infrastructure. These results can be achieved by a method of configuring a packet-switched wide-area communication network including a plurality of nodes interconnected via inter-node links in a meshed topology, and by a configuration tool for configuring a packet-switched wide-area communication network.

According to an exemplary embodiment of the present disclosure, the Parallel Redundancy Protocol (PRP) (IEC 62439-3) is used for traffic duplication and redundant transport of the duplicated traffic in a single packet-switched wide-area communication network including a plurality of nodes interconnected via inter-node links in a meshed topology. It should be understood that in the context of the present disclosure a node is configured to include a suitable processor, computing device, or computer processor, which execute program code for implementing the Parallel Redundancy Protocol, or other algorithm or protocol as desired. Traffic duplication and redundant transport include identifying, between a send and receive node, two distinct and fully redundant communication paths with no link or node in common except for the send and receive node, as well as configuring the send and receive nodes to operate according to the Parallel Redundancy Protocol (PRP), with two distinct communication ports of both the send and receive node being assigned to the two communication path. At any time during regular operation, and for any critical message to be transmitted from the send to the receive node, two redundant packets are then generated, and each of the redundant packets is being sent via one of the two communication paths.

In an advantageous embodiment of the disclosure, a Multiple Spanning Tree Protocol MSTP algorithm is executed for a number of root-bridges selected from among the nodes of the communication network and suitably distributed over the network. For each root-bridge, an instance of a spanning tree is retained. Two spanning tree instances that comprise two distinct communication paths between send and receive node are identified, and a first and second VLAN based on the two spanning tree instances is configured in the communication network. The send and receive nodes are configured as PRP nodes with each of two redundant communication ports assigned to one of the first and second VLAN, and with the duplicated traffic being tagged with two different VLAN tags.

As compared to standard PRP, exemplary embodiments of the present disclosure result in high availability of the wide-area communication network without incurring the cost of full network duplication. Viewed from a different perspective and compared to known SDH, the seamless switchover according to PRP reduces path resilience time in case of a failure of an optical link to less than 1 ms, for example.

Figure 1:
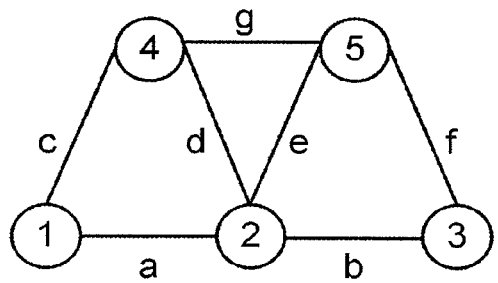
FIG. 1 illustrates a communication network with a meshed topology according to a known implementation.
Figure 2:
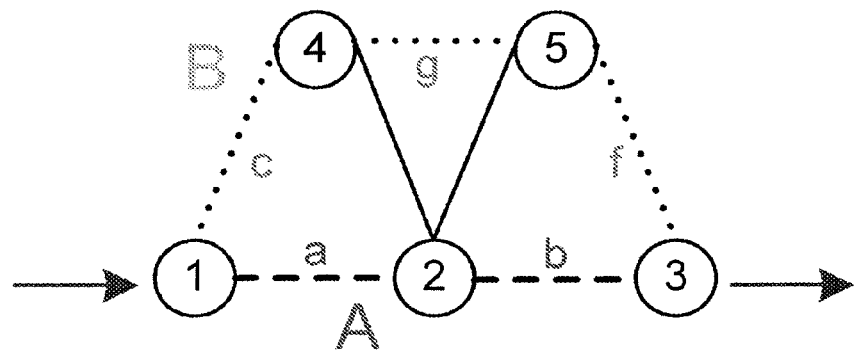
FIG. 2 illustrates the network with two redundant paths A, B between nodes 1 and 3 according to an exemplary embodiment of the present disclosure.

FIG. 2 illustrates the network with two redundant paths A, B between nodes 1 and 3 according to an exemplary embodiment of the present disclosure. FIG. 2 shows a packet-switched Ethernet network with the same meshed topology as in FIG. 1, and with Ethernet traffic to be transmitted from PRP capable sender node 1 to receiver node 3. Between node 1 and node 3, a first path (dashed line) via node 2 is labeled A, while a second path (dotted line) via nodes 4 and 5 is labeled B. The two paths are distinct, e.g., they can have the send/source and receive/destination nodes in common, but the intermediate nodes or inter-node links may not be common. Each packet is duplicated at the sender node, where a first packet is transmitted along path A and a second, redundant packet is transmitted via path B.

Corresponding communication path information can be either appended to the packets, or distributed to the intermediate nodes, in which latter case a routing tag A, B should be appended to the packets. For example, the information about the two distinct routing paths A and B may be coded as two distinct Virtual Local Area Networks VLANs A and B. In this case the communication ports of the nodes of the meshed network are configured such that between nodes 1 and 3, the first message is tagged with a VLAN A identifier and routed through links a-b along path A, whereas the second packet is tagged with a VLAN B identifier and routed through links c-g-f along path B.

In larger networks, the identification of redundant paths between any two nodes and the corresponding assignment of the ports of the intermediate nodes to different VLANs is a time consuming and fault-prone task. The identification of redundant paths can however be supported by using the Multiple Spanning Tree Protocol MSTP. According to the standard IEEE 902.1Q, MSTP allows selecting up to 64 root-bridges, or nodes of origin, in a network, for each of which an instance of a rapid spanning tree is generated. Each spanning tree connects the root-bridge to any other node of the meshed network in a loop-avoiding manner, wherein priorities for nodes and links can be defined to resolve ambiguities. Each of these spanning tree instances may then be assigned to one or several VLANs. Defining formally distinct VLANs based on one spanning tree instance allows extending the VLANs beyond the send and receive node of the network to distinct client or end devices connected to the nodes.

Figure 3:
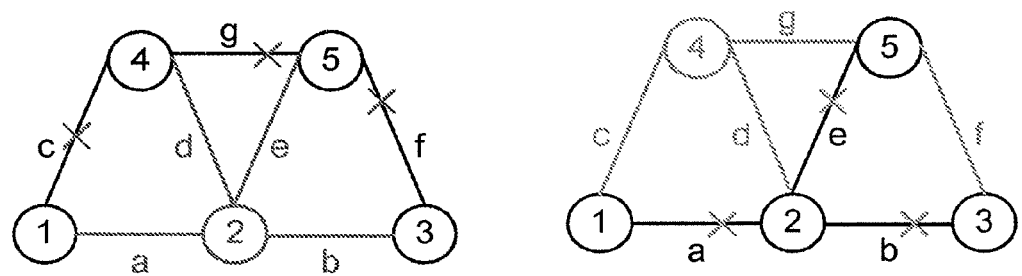
FIG. 3 depicts the network with two MSTP instances defining two exemplary VLANs according to an exemplary embodiment of the disclosure.

FIG. 3 illustrates the network with two MSTP instances defining two exemplary VLANs according to an exemplary embodiment of the disclosure. Namely, FIG. 3 illustrates an exemplary way to obtain VLAN information. In the left-hand diagram, node 2 has been selected as root-bridge for one of the MSTP instances. The spanning tree spanned by this root-bridge—following shortest path between root-bridge and each node—includes links a, b, d and e but block the links c, f and g in order to prevent loops. If VLAN A is assigned to the MSTP instance spanned by the root-bridge in node 2, the Ethernet traffic duplicated and tagged to VLAN A using the PRP algorithm according to FIG. 2 is following the desired links a-b between nodes 1 and 3.

In the right-hand diagram of FIG. 3, by defining node 4 as root-bridge for a second instance of a spanning tree and by assigning VLAN B to the MSTP instance spanned by this root-bridge, Ethernet traffic tagged to VLAN B will follow the desired links c-g-f between the nodes 1 and 3 in the meshed network. In this example, additionally to defining the root-bridge in node 4, the bridge priority of node 5 has to be set higher than the priority of bridge 2 in order to make sure that link b rather than link f is blocked by the spanning tree algorithm. In the resulting VLAN structure, some ports of nodes 2 and 4 are assigned to both VLANs A and B.

The configuration of the MSTP root-bridges and the assignment of the VLANs to these root-bridges can be done as part of the initial configuration/commissioning of the network. For this purpose, it is suggested to distribute the 64 possible root-bridges in an equidistant manner over the entire network, and to assign all 4096 VLANs evenly to the root-bridges, for example 64 VLANs to each of the 64 root bridges. Once the network is operating, 64 instances of rapid spanning trees are spanned and define the different paths through the network.

At least for each pair of source and destination node involved by a service or functionality of the utility, appropriate tools allow to monitor and analyze the VLANs and to identify redundant paths between two nodes of interest. The proposed check for redundant paths may be somewhat elaborate and not guaranteed to be successful. For instance, between nodes 2 and 4, the above VLANs A and B are not sufficient, as they both involve link d. Defining node 5 as another root-bridge however will help.

As a result, Ethernet traffic duplicated according to the modified PRP algorithm should be tagged with appropriate VLAN IDs in order to ensure redundant paths to the desired receiving node. This process allows configuring new redundant data services on an up and running network without the reconfiguration any node in the network with the exception of the sending and receiving nodes implementing the PRP algorithm.

In another exemplary embodiment of the present disclosure, and as an alternative to MSTP and Layer-2 bridged Ethernet technology, MPLS (Multiprotocol Label Switching) as documented in the Request for Comments (RFC) 3031 and 3032 of the Internet Engineering Task Force (IETF) and operating at an OSI model layer between traditional definitions of layer 2 (Data Link Layer) and layer 3 (Network Layer), may be invoked (e.g., executed) to identify two redundant paths between a send and receive node by means of a known traffic engineering scheme as in SDH/SONET networks. The meshed communication network is subsequently configured such that redundant traffic is routed via the redundant paths, preferably by assigning distinct VLAN identifiers to the distinct redundant paths.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of configuring a packet-switched wide-area communication network including a plurality of nodes interconnected via inter-node links in a meshed topology, comprising:
    identifying, between a send node and a receive node, first and second communication paths with no link or node in common except for the send and receive nodes, wherein an intermediate node of the first communication path and an intermediate node of the second communication path are interconnected via an inter-node link of the packet-switched wide-area communication network;
    configuring, in the packet-switched wide-area communication network, a first Virtual Local Area Network (VLAN) and a second VLAN based on the first and second communication paths, respectively; and
    configuring the send and receive nodes to operate according to the Parallel Redundancy Protocol, with first and second communication ports of the send node and first and second communication ports of the receive node being assigned to the first and second VLAN, respectively.

2. The method according to claim 1, comprising:
    performing a Multiple Spanning Tree Protocol algorithm for a number of nodes of the packet-switched wide-area communication network as root-bridges to obtain a number of spanning tree instances;
    identifying a first spanning tree instance that includes the first communication path, and a second spanning tree instance that includes the second communication path between the send node and the receive node; and
    configuring, in the packet-switched wide-area communication network, the first VLAN and the second VLAN based on the first and second spanning tree instance, respectively.

3. The method according to claim 1, comprising:
    identifying the first and second communication paths by means of Multiprotocol Label Switching traffic engineering.

4. The method according to claim 1, comprising:
    identifying all pairs of nodes of the packet-switched wide-area communication network exchanging critical messages; and repeating the procedure for all identified pairs of nodes.

5. The method according to claim 1, wherein the packet-switched wide-area communication network includes nodes located at distinct substations of a utility.

6. The method according to claim 1, comprising:
    tagging, by the send node, a packet with a VLAN identifier of the first VLAN and tagging a duplicate packet with a VLAN identifier of the second VLAN.

7. A configuration tool device for configuring a packet-switched wide-area communication network, comprising: a processor configured to:

identify, between a send node and a receive node, first and second communication paths with no link or node in common except for the send and receive nodes, wherein an intermediate node of the first communication path and an intermediate node of the second communication path are interconnected via an inter-node link of the packet-switched wide-area communication network;

configure, in the packet-switched wide-area communication network, a first Virtual Local Area Network (VLAN) and a second VLAN based on the first and second communication paths, respectively; and configure the send and receive nodes to operate according to the Parallel Redundancy Protocol, with first and second communication ports of the send node and first and second communication ports of the receive node being assigned to the first and second VLAN, respectively.

8. The configuration tool device according to claim 7, wherein the processor is further configured to:

execute a Multiple Spanning Tree Protocol algorithm for a number of nodes of the packet-switched wide-area communication network as root-bridges to obtain a number of spanning tree instances;

identify a first spanning tree instance that includes the first communication path, and a second spanning tree instance that includes the second communication path between the send node and the receive node; and configure in the packet-switched wide-area communication network, the first Virtual Local Area Network VLAN and the second VLAN based on the first and second spanning tree instance, respectively.

9. The configuration tool device according to claim 7, wherein the processor is further configured to:

identify the first and second communication paths by means of Multiprotocol Label Switching traffic engineering.

10. The configuration tool device according to claim 7, wherein the processor is further configured to:

identify all pairs of nodes of the packet-switched wide-area communication network exchanging critical messages; and repeat the procedure for all identified pairs of nodes.

11. The configuration tool device according to claim 7, wherein the processor is configured to communicate in a packet-switched wide-area communication network that includes nodes located at distinct substations of a utility.

12. The configuration tool device according to claim 7, wherein the processor is further configured to:

tag, by the send node, a packet with a VLAN identifier of the first VLAN and tag a duplicate packet with a VLAN identifier of the second VLAN.

13. A packet-switched wide-area communication network including a plurality of nodes interconnected via inter-node links in a meshed topology, comprising:

a first and a second communication path between a send node and a receive node with no link or node in common except for the send and receive nodes and with an intermediate node of the first communication path and an intermediate node of the second communication path being interconnected via an inter-node link of the packet-switched wide-area communication network;

first and second communication ports of the send node and first and second communication ports of the receive node assigned to the first and second communication paths, respectively; and a first Virtual Local Area Network (VLAN) and a second VLAN based on the first and second communication paths, respectively;

wherein the send and receive nodes are configured to operate according to the Parallel Redundancy Protocol, including the send node being configured to transmit a packet along path A in the first VLAN and to transmit, redundantly, a duplicate packet via path B in the second VLAN, and including the receive node being configured to accept the first of the redundant packets and to discard the second of the redundant packets that arrives at a later time.

14. The packet-switched wide-area communication network according to claim 13, wherein the first VLAN comprises a packet being tagged with a VLAN identifier of the first VLAN and the second VLAN comprises a duplicate packet being tagged with a VLAN identifier of the second VLAN.

15. The packet-switched wide-area communication network according to claim 13, wherein the nodes are located at distinct substations of a utility.

* * * * *